(12) United States Patent
Neumann

(10) Patent No.: US 12,260,365 B2
(45) Date of Patent: *Mar. 25, 2025

(54) SYSTEMS AND METHODS FOR DETERMINING ESTIMATED ALIMENTARY ELEMENT TRANSFER TIME

(71) Applicant: KPN INNOVATIONS, LLC., Lakewood, CO (US)

(72) Inventor: Kenneth Neumann, Lakewood, CO (US)

(*) Notice: Subject to any disclaimer, the term of this patent is extended or adjusted under 35 U.S.C. 154(b) by 248 days.

This patent is subject to a terminal disclaimer.

(21) Appl. No.: 17/884,880

(22) Filed: Aug. 10, 2022

(65) Prior Publication Data

US 2022/0383253 A1   Dec. 1, 2022

Related U.S. Application Data

(63) Continuation of application No. 17/088,167, filed on Nov. 3, 2020, now Pat. No. 11,481,717.

(51) Int. Cl.
  *G06Q 10/06* (2023.01)
  *G06F 16/2457* (2019.01)
  (Continued)

(52) U.S. Cl.
  CPC ...... *G06Q 10/0833* (2013.01); *G06F 16/24573* (2019.01); *G06F 16/2462* (2019.01);
  (Continued)

(58) Field of Classification Search
  CPC .................. G06Q 10/0833; G06Q 10/047
  See application file for complete search history.

(56) References Cited

U.S. PATENT DOCUMENTS 9,824,410 B1    11/2017  Sendelbach et al.
10,467,559 B1 *  11/2019  Svenson .......... G06Q 10/06311
(Continued)

FOREIGN PATENT DOCUMENTS

CN   110991973 A  *  4/2020  ........ G06Q 10/0833

OTHER PUBLICATIONS

Macvean, S. (May 2, 2019). Our order tracker—designing a product that crosses the physical and digital divide. Retrieved Mar. 13, 2021, from https://medium.com/deliveroo-design/our-order-tracker-designing-a-product-that-crosses-the-physical-and-digital-divide-7cc773d84245. (Year: 2019).*

(Continued)

*Primary Examiner* — Mehmet Yesildag
*Assistant Examiner* — Jeremy L Gunn
(74) *Attorney, Agent, or Firm* — Caldwell Intellectual Property Law

(57) ABSTRACT

A system for determining estimated alimentary element transfer time, the system comprising a computing device adapted to receive a plurality of alimentary elements and a plurality of destinations, determine an estimated transfer time, wherein determining includes retrieving a plurality of locations of a plurality of transfer apparatuses wherein the plurality of locations are associated with a plurality of transfer paths, generate a plurality of transfer times, determine an estimated transfer time as a function of the plurality of transfer times, generate an accuracy measure based on the estimated transfer time, wherein generating includes computing a plurality of transfer time variations, generate an accuracy measure based on a plurality of statistical parameters, and provide an estimated transfer time, wherein providing includes receiving a new alimentary element request, retrieving an estimated transfer time, retrieving the accuracy measure, and provide an estimated transfer time accuracy message.

18 Claims, 9 Drawing Sheets

(51) Int. Cl.
*G06F 16/2458* (2019.01)
*G06N 20/00* (2019.01)
*G06Q 10/047* (2023.01)
*G06Q 10/0833* (2023.01)
*H04W 4/029* (2018.01)

(52) U.S. Cl.
CPC ........... *G06N 20/00* (2019.01); *G06Q 10/047* (2013.01); *H04W 4/029* (2018.02)

(56) References Cited

U.S. PATENT DOCUMENTS

| | | | | |
|---|---|---|---|---|
| 11,210,721 | B1* | 12/2021 | Feng | G06Q 30/0631 |
| 2009/0048890 | A1* | 2/2009 | Burgh | G06Q 10/06375 |
| | | | | 705/7.26 |
| 2014/0370167 | A1 | 12/2014 | Garden | |
| 2015/0262121 | A1* | 9/2015 | Riel-Dalpe | G06Q 50/12 |
| | | | | 705/15 |
| 2017/0193444 | A1* | 7/2017 | Dearing | G06Q 10/0833 |
| 2018/0033098 | A1* | 2/2018 | Sendelbach | G06Q 50/12 |
| 2018/0260736 | A1* | 9/2018 | Yates | H04L 67/535 |
| 2019/0180229 | A1* | 6/2019 | Phillips | G06Q 10/0833 |
| 2019/0205828 | A1* | 7/2019 | O'Hara | G06N 7/01 |
| 2020/0118071 | A1* | 4/2020 | Venkatesan | G06N 20/00 |

OTHER PUBLICATIONS

English translation of CN 110991973 A (Year: 2020).*
English Translation of CN110991973A, obtained from espacenet.com (Year: 2020).
Macvean, S. (May 2, 2019). Our order tracker—designing a product that crosses the physical and digital (Year: 2019).

* cited by examiner

SYSTEMS AND METHODS FOR DETERMINING ESTIMATED ALIMENTARY ELEMENT TRANSFER TIME

CROSS-REFERENCE TO RELATED APPLICATIONS

This application is a continuation of Non-provisional application Ser. No. 17/088,167 filed on Nov. 3, 2020 and entitled "SYSTEMS AND METHODS FOR DETERMINING ESTIMATED ALIMENTARY ELEMENT TRANSFER TIME," the entirety of which is incorporated herein by reference.

FIELD OF THE INVENTION

The present invention generally relates to the field of machine-learning. In particular, the present invention is directed to methods and systems for determining estimated alimentary element transfer time.

BACKGROUND

The availability of internet integration into devices along with the usage of Global Positioning System ("GPS") receivers on devices allows alimentary element originators to locate users near their physical locations. Users can now locate suitable alimentary element originators and send requests to receive alimentary elements.

SUMMARY OF THE DISCLOSURE

In an aspect, a system for determining estimated alimentary element transfer time, the system including a computing device, the computing device configured to receive a plurality of alimentary elements and a plurality of destinations associated with the alimentary elements determine an estimated transfer time for at least one alimentary element in the plurality of alimentary elements; generate, an accuracy measure of the estimated transfer time based on the estimated transfer time, wherein generating the accuracy measure further includes: computing a set of limitations of each alimentary element in the plurality of alimentary elements, wherein the set of limitations includes at least an ancillary limitation including at least a dietary restriction based on a user's biological data; and numerical data relating to the plurality of transfer apparatuses traversing the plurality of transfer paths, including at least inclement weather; training a machine-learning model to generate the accuracy measure, wherein training the machine-learning training a machine-learning model utilizing training data including inputs including at least a plurality of transfer time variations correlated to outputs including accuracy measures; successively determine an accuracy measure of the estimated transfer time for each of the plurality of alimentary elements; and successively retrain the machine-learning model; receive a new alimentary element request for an alimentary element originator from an alimentary element originator device; determine an updated estimated transfer time and an updated accuracy measure, using the retrained machine-learning model for the new alimentary element request; and generate an accuracy message, based on the updated accuracy measure and the updated estimated transfer time.

In another aspect, a method for determining estimated alimentary element transfer time, the method including receiving, by a computing device, a plurality of alimentary elements and a plurality of destinations associated with the alimentary elements; determining, by the computing device an estimated transfer time for at least one alimentary element in the plurality of alimentary elements; generating, by the computing device, an accuracy measure of the estimated transfer time based on the estimated transfer time, wherein generating the accuracy measure further includes: computing a set of limitations of each alimentary element in the plurality of alimentary elements, wherein the set of limitations includes at least an ancillary limitation including at least a dietary restriction based on a user's biological data; and numerical data relating to the plurality of transfer apparatuses traversing the plurality of transfer paths, including at least inclement weather; training a machine-learning model to generate the accuracy measure, wherein training the machine-learning training a machine-learning model utilizing training data including inputs including at least a plurality of transfer time variations correlated to outputs including accuracy measures; successively determine an accuracy measure of the estimated transfer time for each of the plurality of alimentary elements; and successively retrain the machine-learning model; receiving, by the computing device, a new alimentary element request for an alimentary element originator from an alimentary element originator device; determining, by the computing device, an updated estimated transfer time and an updated accuracy measure, using the retrained machine-learning model for the new alimentary element request; and generating, by the computing device, an accuracy message, based on the updated accuracy measure and the updated estimated transfer time.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for determining estimated alimentary element transfer time. In an embodiment, system includes a computing device configured to receive a plurality of alimentary elements and associated destinations. Computing device is configured to determine an estimated transfer time including retrieving a plurality of locations of a plurality of transfer apparatuses with an associated plurality of transfer paths. In an embodiment, computing device may be configured to generate accuracy measures of the estimated transfer time by generating functions describing accuracy using a machine-learning process and a set of limitations. Computing device is configured to provide the estimated transfer time, accuracy measure, and an estimated transfer time accuracy message.

Figure 1:
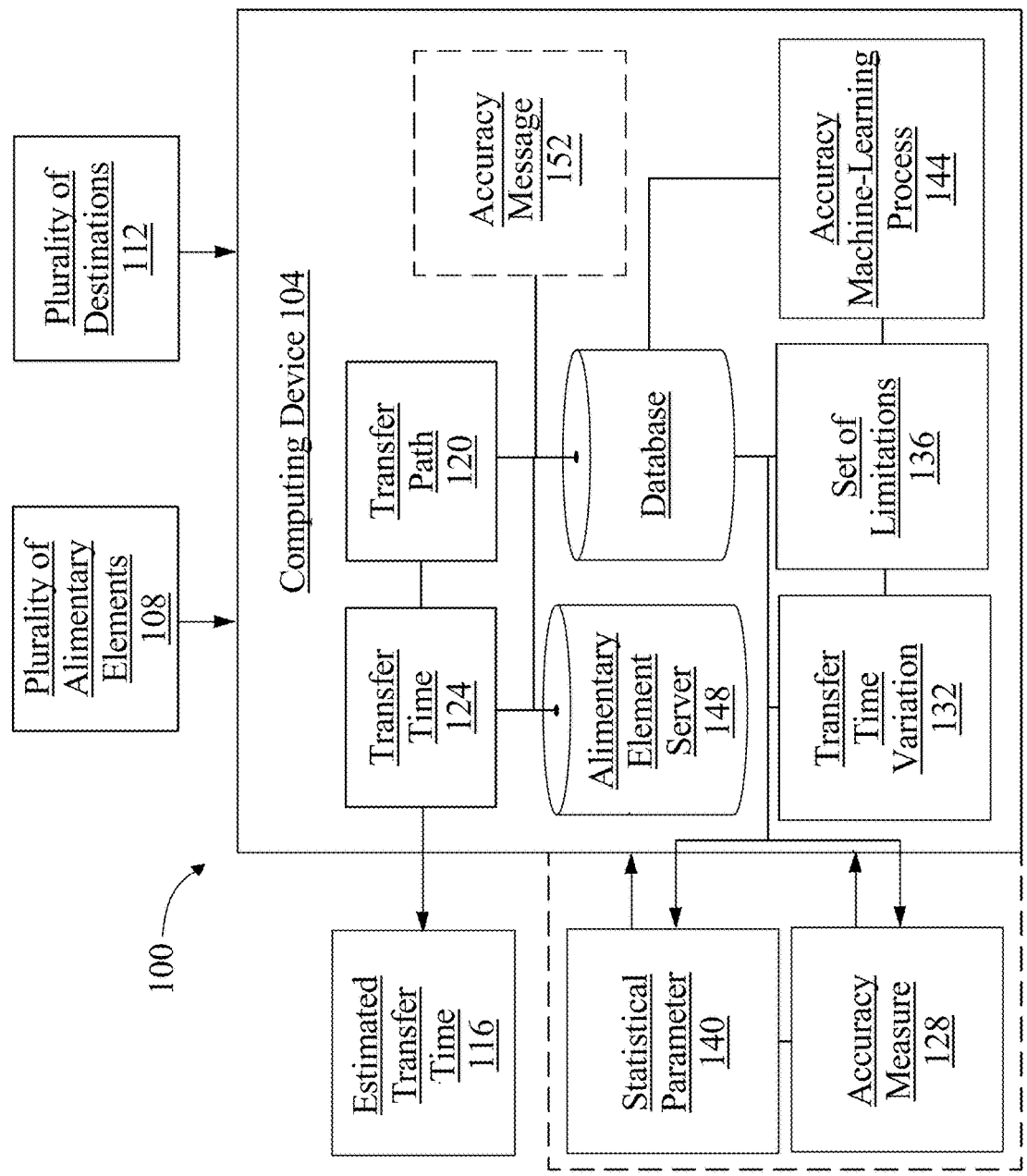
FIG. 1 is a block diagram illustrating a system for determining estimated alimentary element transfer time.

Referring now to FIG. 1, an exemplary embodiment of a system for determining estimated alimentary element transfer time is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Continuing in reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 is adapted to receive a plurality of alimentary elements and a plurality of destinations associated with the plurality of alimentary elements. An "alimentary element," is a meal, grocery item, food element, beverage, nutrition supplement, edible arrangement, or the like, that may be generated by a restaurant, cafeteria, fast food chain, grocery store, food truck, farmer's market, proprietor, convenience store, deli, or any place that provides the above to an individual. A "destination," as used in this disclosure, is a location associated with an alimentary element. Receiving a plurality of alimentary elements 108 may include multiple alimentary elements from a single user and/or from a plurality of users. Receiving a plurality of destinations 112 associated with the alimentary elements may include multiple distinct destinations and/or destinations that correspond to the same location. Computing device 104 may receive a plurality of alimentary elements 108 directly from one or more users; alternatively or additionally, computing device 104 may receive such alimentary elements from multiple places, such as from alimentary element originators, transfer apparatuses, mobile applications, web-based user interfaces (UIs), or the like.

Continuing in reference to FIG. 1, computing device 104 is configured to determine an estimated transfer time 116 for at least one alimentary element in the plurality of alimentary elements. An "estimated transfer time," as used in this disclosure, is a length of time associated with steps involved in receival, preparation, and/or transfer of an alimentary element. An estimated transfer time 116 may include the time necessary for procuring and/or preparing ingredients, utensils, packaging, etc. in preparation and/or generation of an alimentary element by the alimentary element originator. An "alimentary element originator," as used in this disclosure, is an entity that may prepare and/or generate an alimentary element. Such an alimentary element originator may be simply referred to herein as an "originator." An estimated transfer time 116 may include the time necessary for preparing and/or generating an alimentary element by an originator. Estimated transfer time 116 may include the time needed for a transfer apparatus to travel from a first location to the location of the alimentary element, wherein the first location may be the current transfer apparatus location. Estimated transfer time 116 may include the time needed for a transfer apparatus to travel from the originator to an alimentary element destination, such as user location. Estimated transfer time 116 may include the time necessary for a transfer apparatus to receive a plurality of alimentary elements, including other alimentary elements not associated with a first alimentary element. Estimated transfer time 116 may include times associated with a transfer apparatus to exchange alimentary elements with another transfer apparatus, for instance at an interchange node as described in U.S. Nonprovisional application Ser. No. 16/983,096 filed Aug. 3, 2020, titled "METHOD OF AND SYSTEM FOR DETERMINING PHYSICAL TRANSFER INTERCHANGE NODES," the entirety of which is incorporated herein by reference.

Continuing in reference to FIG. 1, determining an estimated transfer time 116 includes retrieving a plurality of locations of a plurality of transfer apparatuses from the computing device 104. A "transfer apparatus," as used in this disclosure, is an apparatus suitable for physically transferring an alimentary element, and that is associated with, incorporated in, and/or operated by computing device 104 and/or user. A transfer apparatus may include a vehicle, bike, drone, robot, autonomous vehicle, car, truck, etc. A "plurality of locations," as used in this disclosure, are locations associated with a transfer apparatus. A plurality of locations of a plurality of transfer apparatuses may include current locations of multiple transfer apparatus, wherein transfer apparatuses may be stationary, en route, at an originator, at an alimentary element destination, fuel and/or charge station, among other locations. A plurality of locations may be multiple locations associated with a transfer apparatus, wherein the locations track the position of the transfer apparatus along a transfer path. A plurality of locations may be multiple locations associated with a single transfer apparatus, for instance a series of locations tracing a path.

Continuing in reference to FIG. 1, each of plurality of transfer apparatuses is associated with a location of a plurality of first locations, wherein the plurality of first locations are associated with a plurality of transfer paths from an alimentary originator location to an alimentary element destination. A plurality of first locations may include the current locations of the plurality of transfer apparatuses and/or a starting point location of at least a transfer apparatus. A plurality of first locations may include the alimentary element originator location for embarking on a transfer path from receiving the alimentary element to the alimentary element destination. A "transfer path," as used in this disclosure, is a path that a transfer apparatus may follow for completing a transfer. A transfer path 120 may include a route on a map, such as displayed by a mapping tool, mapping algorithm, mapping applications (such as GOOGLE MAPS), or the like, that links locations, addresses, GPS coordinates, or the like. A transfer path 120 may include, for instance and without limitation, an optimized route, wherein optimization is to minimize the time needed to traverse the transfer path, minimizes the number of transfer apparatuses, among other parameters.

Continuing in reference to FIG. 1, the plurality of transfer paths 120 may include a first transfer path for at least a transfer apparatus to traverse from the first location to the location of the alimentary element originator, wherein the first transfer path may minimize the time for traversing a first transfer path. A first transfer path may include a route that guides a transfer apparatus from a first location to the alimentary element originator, wherein the transfer path may include being "optimized" in that it minimizes the time required for such an action, among other optimizations. A first transfer path may be generated, stored and/or retrieved as described in U.S. Nonprovisional application Ser. No. 16/890,839 filed Jun. 2, 2020, titled "METHODS AND SYSTEMS FOR PATH SELECTION USING VEHICLE ROUTE GUIDANCE," the entirety of which is incorporated herein by reference.

Continuing in reference to FIG. 1, the plurality of transfer paths 120 may include a second transfer path for at least a transfer apparatus to traverse from the location of the alimentary element originator to the alimentary element destination, wherein the second transfer path minimizes time for traversing a second transfer path. A second transfer path may include a route that guides a transfer apparatus from the originator location to the alimentary element destination, wherein the transfer path is "optimized" in that it minimizes the time required for such an action, among other optimizations. A second transfer path may be generated, stored and/or retrieved, as described above for a first transfer path. A second transfer path may be the same as a first transfer path, in that both represent a single transfer path 120. A second transfer path and/or a first transfer path may be generated to minimize physical resources such as number of transfer apparatuses, amount of personnel, transfer distance, among other physical parameters. A second transfer path and/or a first transfer path may be generated to minimize non-physical resources such as time, diminishment of quality and/or satisfaction, among other non-physical resources. Transfer paths 120 may be stored and/or retrieved from a server, computing device, and/or database such as a NOSQL database, a relational database, a key-retrieval database, cloud-based database, object-oriented database, distributed database, non-transitory computer-readable storage medium, or the like.

Continuing in reference to FIG. 1, determining an estimated transfer time 116 includes generating a plurality of transfer times associated with the plurality of transfer paths. A "transfer time," is a numerical value that relates to an amount of time necessary for traversing a transfer path 120. A transfer time 124 may include times associated with a first transfer path, second transfer path, among other transfer paths. Generating a transfer time 124 may include retrieving at transfer time 124 from a database, for instance from where a transfer path 120 was retrieved. Generating a transfer time 124 may include determining the time to complete a transfer path 120 for instance as calculated, determined, and/or retrieved from a mapping application, algorithm, the Internet, or the like, as described above.

Continuing in reference to FIG. 1, computing device 104 is configured for determining an estimated transfer time as a function of the plurality of transfer times 124. As used in this disclosure, an "estimated transfer time," is an estimated time for completing a transfer. Estimated transfer time 116 may include a single estimated time for completion of an entire transfer. Estimated transfer time 116 may include a plurality of estimated time points for incremental steps in the transfer. An estimated transfer time 116 may be determined as a function of a plurality of transfer times 124, for instance and without limitation, using a mathematical operation such as addition, wherein an additive time from a plurality of transfer paths 120 results in an estimated transfer time 116. An estimated transfer time 116 may be determined according to a set of limitations, and the effects the set of limitations may have on the estimated transfer time 116, as described in further detail below. Computing device 104 may generate and/or retrieve, for instance from a database, a plurality of transfer times associated with a plurality of transfer paths 124. Computing device 104 may generate a transfer time associated with a transfer path, for instance and without limitation, by using a mapping application and/or one or more sources of data, such as the Internet, as described above, to generate a time to complete a transfer path. Computing device 104 may determine an estimated transfer time 116 as a function of the plurality of transfer times, for instance and without limitation, by adding the times into a singular sum of total time for transfer.

Continuing in reference to FIG. 1, computing device 104 is configured to generate an accuracy measure of estimated transfer time based on the estimated transfer time 116. An "accuracy measure," as used in this disclosure, is a parameter that describes the closeness, or accuracy, of time estimates from a first estimated transfer time 116. Aberrations and/or differences in accuracy measures 128 between time estimates may arise from a plurality of parameters, including the number of alimentary elements assigned to a transfer path 120, the number of transfer apparatuses, the ratio of alimentary elements per transfer path 120 associated with each transfer apparatus, weather, traffic, roadwork, time of day, number of alimentary element requests per originator, among other parameters. Relationships between parameters, such as the transfer path 120 distance and the quantity of alimentary elements assigned to a transfer apparatus, may affect the estimated transfer time 116. Deviations from a first estimated transfer time 116 and an actual transfer time of an alimentary element may be described by an accuracy measure 128.

Continuing in reference to FIG. 1, generating the accuracy measure 128 includes computing a plurality of transfer time variations from the estimated transfer time 116 and a set of limitations of each alimentary element in the plurality of alimentary elements. "Transfer time variations," as used in this disclosure, are differences, or variations, in estimated transfer time 116 according to variations in a set of limitations as it applied to transfer of at least an alimentary element. Transfer time variations 132 may be affected by variables described in a set of limitations. A "set of limitations," as used in this disclosure, are variables, parameters, and the like, that may affect transfer time of at least an alimentary element. Set of limitations 136 may include, for instance, originator-side limitations such as ingredient and/or originator staff shortage, stringency in alimentary element prep time due to allergens, and/or transfer apparatus-side limitations such as transfer apparatus taking a detour, etc. Transfer time variations 132 may fluctuate as a function of the set of limitations 136, wherein perturbing, or otherwise changing the value and/or selection of a variable and/or parameter in the set of limitations 136, such as traffic, weather, number of available transfer apparatuses, etc., may result in a transfer time that is different from the estimated transfer time 116. For instance in non-limiting illustrative examples, calculating a transfer time variation 132 for an alimentary element may show that transfer times change as a function of time of day, wherein if a user requests an alimentary element at dinner it may take significantly longer than when requested for lunch. In such an example, a user's alimentary element program may dictate eating during a specific window of time, wherein the results of the transfer time variation 136 may affect when the user should place an alimentary element request. Computing device 104 may track the accuracy measure 128 as an alimentary element is transferred along a transfer path, and update the estimated transfer time 116, as a function of the accuracy measure 128.

Continuing in reference to FIG. 1, the set of limitations 136 may include numerical data relating to the plurality of alimentary elements. Numerical data relating to the plurality of alimentary elements may include the number of alimentary elements. Numerical data relating to the plurality of alimentary elements may include variables that may affect the estimated transfer time 116 from the alimentary element originator-side, such as the number of alimentary element requests received as a function of time. For instance, numerical data relating to the plurality of alimentary elements may include the number of alimentary elements an alimentary element originator is accommodating as the computing device 104 receives a request for an alimentary element from a user. In non-limiting illustrative examples, an alimentary element originator may be quicker or slower in preparing and/or generating an alimentary element as a function of how 'busy' the alimentary element originator is. In such an example, the greater the number of alimentary elements, the fewer staff available, etc. may represent numerical data relating to the plurality of alimentary elements that may affect the estimated transfer time 116 and changes in such data may represent differences in transfer time variations 136.

Continuing in reference to FIG. 1, the set of limitations 136 may include numerical data relating to the plurality of transfer apparatuses traversing the plurality of transfer paths 120. Numerical data relating to the plurality of transfer apparatuses may include variables that may affect the estimated transfer time 116 from the transfer apparatus-side. For instance, numerical data relating to the plurality of transfer apparatuses traversing the plurality of transfer paths 120 may include the number of transfer apparatuses, the availability of transfer apparatus, the time-distance data associated with the first locations associated with the transfer apparatuses—for example, the distance a transfer apparatus is from the alimentary element originator and how long it takes to receive the alimentary element. Numerical data regarding the availability of transfer apparatuses may include, for instance, a binary system such as a "0/1" to indicate "available/not available". Numerical data relating to the plurality of transfer paths 120 may include the distances of the paths, the time required to traverse the transfer path 120, the number of stops along the transfer path 120, among other parameters associated with assigning transfer path 120. Numerical data relating to the plurality of transfer paths may include traffic wait times, weather delays from precipitation, the wait times associated with and presence of roadwork, and other factors that a computing device 104 may receive from the Internet, mapping application such as GOOGLE MAPS, or the like. Such numerical data, such as estimated driving times, distances, path detours, and the like, may be included in the set of limitations 136 affecting the accuracy measure 128 of an estimated transfer time 116. In non-limiting illustrative examples, an estimated transfer time 116 may be determined for transfer of an alimentary element under the assumption there is no roadwork or inclement weather, wherein a request was sent by a user during a period when roadwork began along the transfer path 120 the day prior to the request and there are heavy thunderstorms during alimentary element transfer. In such an example, transfer time variation 132 under such a set of limitations 136 may indicate a low accuracy measure 128, more specifically in favor of increasing the estimated transfer time 116.

Continuing in reference to FIG. 1, the set of limitations 136 may include at least an ancillary limitation that poses an effect on transfer path 120 time. An "ancillary limitation," as used in this disclosure, is a limitation that is associated with a user's alimentary program and that affects estimated transfer time 116. An "alimentary element program," as used in this disclosure, is a plurality of alimentary elements, or instructions regarding a plurality of alimentary elements, that a user may be instructed to select based on a user's physiology. An alimentary element program may include a catalogue of alimentary elements built for a user as a function of the user's biological, physiological, and/or medical data. An ancillary limitation may include health rules, dietary restrictions, and the like, that arise from a user's alimentary element program that can affect the estimated transfer time 116. For instance, a need for an alimentary element originator to carefully avoid a food allergen may increase the estimated transfer time 116 for a particular alimentary element, or from a particular originator. In such a case, the set of limitations 136 may include such an ancillary limitation.

Continuing in reference to FIG. 1, computing a plurality of transfer time variations 132 from the estimated transfer time 116 and a set of limitations 136 may include generating a variety of transfer times as a function of each limitation in the set of limitations 136. As described above, each limitation in a set of limitation 128 may have an effect on the estimated transfer time 116. Computing device 104 may generate a plurality of transfer time variations 132, wherein each transfer time variation 132 is a deviation from a first estimated transfer time 116, incorporating a limitation from the set of limitations 136. Computing device 104 may compute a transfer time variation 132, for instance and without limitation, for each alimentary element in a plurality of alimentary elements, for each alimentary element originator, transfer path, and/or transfer apparatus.

Continuing in reference to FIG. 1, generating an accuracy measure 128 includes generating the accuracy measure 128 as a function of a plurality of statistical parameters of the plurality of transfer time variations 132. A "statistical parameter," as used in this disclosure, is a measure of the precision of a transfer time variation 132 from an estimated transfer time 116. The precision of a measurement system is related to the reproducibility and repeatability and the degree to which the repeated measurements under unchanged (or changing) conditions show the same results. A statistical parameter 140 may be expressed as a mean, median, range, standard deviation, variance, confidence interval, normal distribution, one-tailed distribution, among other statistical relationships and parameters, and/or any combination thereof. A statistical parameter 140 may include the spread, variation, bias, and/or systematic error of the system of measurements for transfer time variations 132 relating to at least an estimated transfer time 116.

Continuing in reference to FIG. 1, for instance and without limitation, for a given plurality of transfer time variations 132, the estimated transfer time 116 may increase on average by +10 minutes, as denoted by the statistical parameter 140. In such an example, the accuracy measure 128 may include the statistical parameter 140 for the plurality of transfer time variations 132 and be used to correct, adjust, or otherwise recalculate the estimated transfer time 116; such a recalculation as a function of the set of limitations 136 may result in an estimated transfer time 116 adjusted by the average+10-minute increased time. In non-limiting illustrative examples, for a particular user attempting to obtain an alimentary element from a particular location, for a set of limitations 136 involving traffic, weather, and roadwork, the average transfer time variation 132 may be +5 minutes. If this were the case, the accuracy measure 128 would reflect a statistical parameter 140 of an average of +5 minutes added to any calculated estimated transfer time 116 for alike alimentary elements coming from that alimentary element originator to that destination. Computing device 104 may attribute differences in the plurality of transfer time variations 132 from the estimated transfer time 116, as a function of a set of limitations 136, and the statistical parameters 140 that described the transfer time variations 132 from the estimated transfer time 116 as accuracy measures 128. An accuracy measure 128 may help alimentary element originators and/or transfer apparatuses to adjust timing in preparing, receiving, and/or handing-off alimentary elements to better adhere to an estimated transfer time 116.

Continuing in reference to FIG. 1, deriving at least a statistical parameter 140 from the plurality of transfer time variations 132 may include calculating a likelihood the estimated transfer time 116 will deviate as a function of a change in the set of limitations 136. Statistical parameter 140 may be represented as a probability, percentile, or the like, that describes a likelihood the estimated transfer time 116 is incorrect, inaccurate, or will otherwise require modification to reflect a more accurate estimated transfer time 116. The degree to which the estimated transfer time 116 may need to be changed and the likelihood it should be changed may both be reflected in the accuracy measure 128.

Continuing in reference to FIG. 1, generating an accuracy measure 128 may include generating, using an accuracy machine-learning process. An accuracy machine-learning function, as used in this disclosure, is a function that estimates the accuracy of the estimated transfer time 116 based on which limitations are present and calculating a change in the estimated transfer time 116 based on the limitations. An accuracy machine-learning process may include any machine-learning algorithm, process, and/or model, as described in further detail below. Accuracy machine-learning process 144 may accept an input that includes a plurality of transfer time variations 128 and statistical parameters 140 for a set of limitations 136 generate an output that is a function, for instance and without limitation, that describes the effect (or response) on estimated transfer time 116 as a function of the amount (or magnitude) of a limitation imposed on the transfer of an alimentary element and/or plurality of alimentary elements. In non-limiting illustrative examples, accuracy machine-learning process 144 may generate values of effect on estimated transfer time 116 as a function of health rules and dietary restrictions in a user's alimentary element program, which determine that as the presence of the limitation increases, the estimated transfer time 116 increases at specific interval values. Accuracy machine-learning process 144 may perform such calculations for many limitations, at varying magnitudes of limitation, to generate an accuracy measure 128 that may enable computing device 104 to produce a more accurate estimated transfer time 116. Accuracy machine-learning process 144 may calculate estimated transfer time 116 from the generated accuracy measure 128, wherein the accuracy measure 128 informs (controls) the magnitude and direction of the change in the estimated transfer time 116.

Continuing in reference to FIG. 1, computing device may generate training data using elements collected in previous iterations of embodiments of methods in this disclosure, for instance received in the form of data tracked for past transfer, and the like. Computing device 104 may generate training data, for instance and without limitation, from data contained in the set of limitations 136, past transfer time variations 132, and/or past statistical parameters 140 to train a machine-learning model for generating an accuracy measure 128 and/or plurality of accuracy measures 128. For instance and without limitation, if a user orders alimentary elements to the same location multiple times, then system 100 may become more robust with greater number of calculations, and improved accuracy measures 128, without necessarily relying on the original training data/model. Machine-learning model may be generated by and/or include any machine-learning process, algorithm, or model, performed by a machine-learning module, as described in further detail below. Training the machine-learning model to generate accuracy measures 128 may include training the machine-learning model as a function of training data that includes a plurality of entries wherein each entry models the set of limitations 136 to data related to the transfer time variations 132. Likewise, training the machine-learning model may use training data describing transfer time variations 132 as modeled to statistical parameters 140, or any other modeling relationship between related parameters, metrics, and/or measures, as described above. Persons skilled in the art, upon review of the disclosure in its entirety, will appreciate that system 100 may determine more robust accuracy parameters 128 and refined estimated transfer time 116 calculations with increased use by user, wherein determinations from past iterations of embodiments of methods may become training data.

Continuing in reference to FIG. 1, computing device 104 providing an estimated transfer time 116 includes receiving a new alimentary element request for the alimentary element originator from an alimentary element originator device. Alimentary element originator may receive a new alimentary element request from an alimentary element originator device, wherein the alimentary element originator device is a computing device and/or user device, as described herein. Alimentary element originator may receive such a request, for instance from a single user, plurality of users, alimentary element ordering application, online ordering interface, or the like.

Continuing in reference to FIG. 1, computing device 104 providing an estimated transfer time 116 includes retrieving an estimated transfer time 116 from the new alimentary element request. An alimentary element request may include data, such as the alimentary element identity and destination, which computing device 104 may user to retrieve, for instance from a database, an estimated transfer time 116. A database may be any database such as an Oracle database or Microsoft SQL database, as described in further detail below.

Continuing in reference to FIG. 1, computing device 104 providing an estimated transfer time 116 includes retrieving the accuracy measure 128 of the alimentary element originator from the alimentary element server. An "alimentary element server," as used in this disclosure, is computer hardware and/or software that an alimentary element originator may use for information exchange between a database, on-site computing devices, and/or system 100. Alimentary element server 148 may retrieve accuracy measure 128 as a function of alimentary element originator receiving a request for an alimentary element. Accuracy measure 128 may include data unique to a particular alimentary element originator. For instance, accuracy measures 128 may include data that shows a particular alimentary element originator underperforms and/or exceed expectation with respect to estimated transfer time 116. Such underperformance and/or exceptional performance may occur according to patterns in time, location, staff performance, particular alimentary elements, and the like. Accuracy measure 128 may inform alimentary element originator on when to commence preparation of alimentary element and/or when to provide transfer apparatus an alimentary element.

Continuing in reference to FIG. 1, computing device 104 providing an estimated transfer time 116 includes generating, based on the accuracy measure 128 and estimated transfer time 116 for the new alimentary element request, an estimated transfer time accuracy message for the new alimentary element. An "accuracy message," as used in this disclosure is a message and/or indication of the calculated estimated transfer time 116 and its accuracy. Accuracy message 152 may include data concerning the accuracy of an estimated transfer time 116. Accuracy message 152 may include data concerning the likelihood an estimated transfer time 116 is accurate, including the propensity an estimated transfer time 116 may change (for instance by including statistical parameters 140). Accuracy message 152 may include information for alimentary element originator, transfer apparatus, and/or user of system 100 concerning the status of an alimentary element, such as "on time" and/or altering an estimated transfer time 116 to reflect a more accurate estimated transfer time 116. Accuracy message 152 may include the estimated transfer time 116 and/or accuracy measure 128.

Continuing in reference to FIG. 1, generating the estimated transfer time 116 and the estimated transfer time accuracy message 152 to the alimentary element originator device may include generating a representation, via a graphical user interface, of the estimated transfer time 116 and the estimated transfer time accuracy message 152 to the alimentary element originator device. Computing device 104 may generate a representation of the accuracy message 152, including the estimated transfer time 116, accuracy measurement 128, statistical parameter 140, and/or any other determination by system 100 to alimentary element originator. Computing device 104 may generate a representation of the above via a graphical user interface. A "graphical user interface," as used in this disclosure is any form of interface that allows a user to interface with an electronic device through graphical icons, audio indicators, text-based interface, typed command labels, text navigation, and the like, wherein the interface is configured to provide information to the user and accept input from the user. Graphical user interface may accept user input, wherein user input may include a new alimentary element request, an indication that an estimated transfer time was incorrect, correct, and the like.

Continuing in reference to FIG. 1, generating the estimated transfer time 116 and the estimated transfer time accuracy message 152 may include generating a representation, via a graphical user interface, of the estimated transfer time 116 and the estimated transfer time accuracy message 152 to a user device. Computing device 104 may generate a representation of the accuracy message 152, including the estimated transfer time 116, accuracy measurement 128, statistical parameter 140, and/or any other determination by system 100 to user device. User device may include a transfer apparatus intending to receive alimentary element from alimentary element originator and/or transfer alimentary element to a destination associated with alimentary element. User device may include a device associated with user that sent an alimentary element request.

Figure 2:
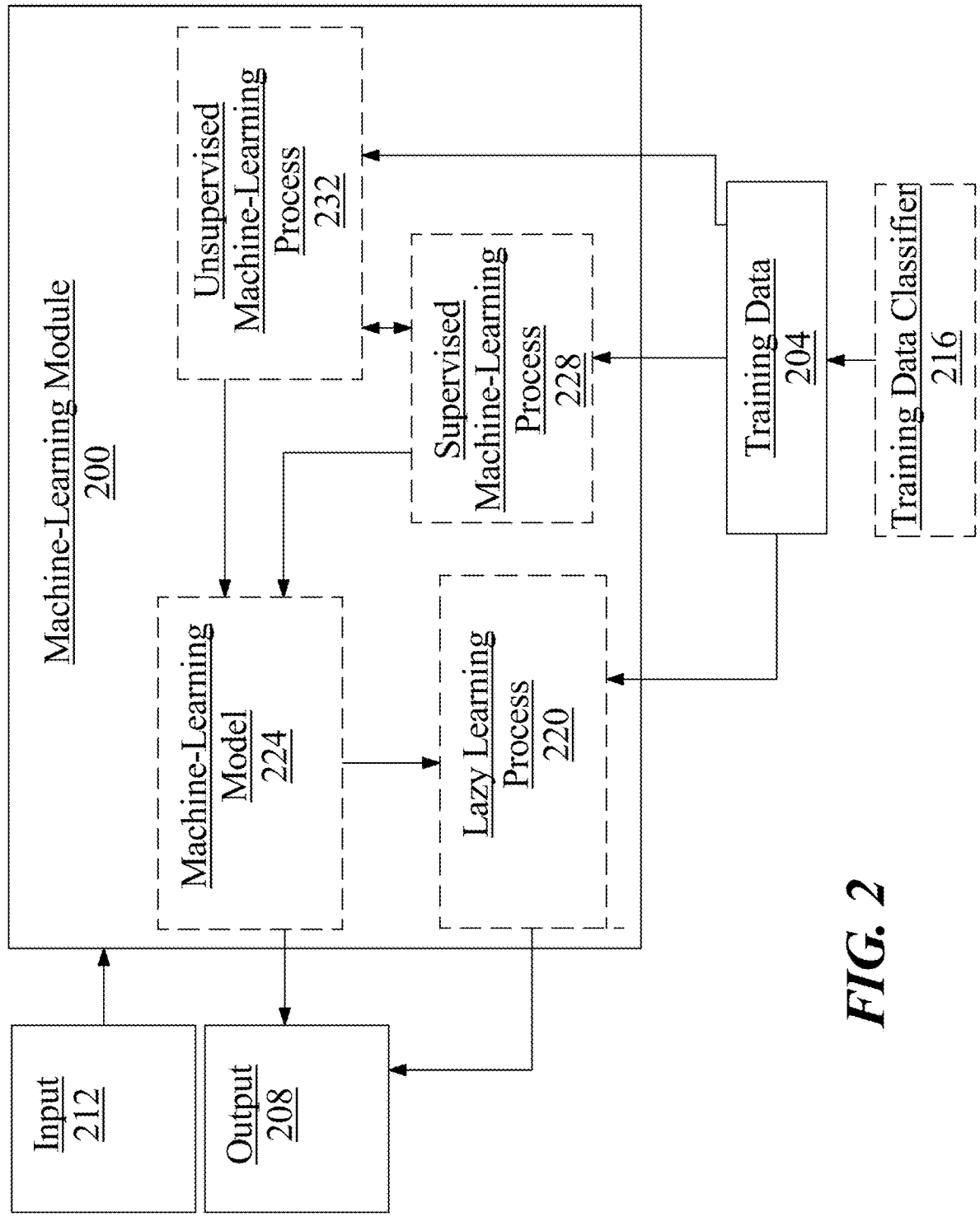
FIG. 2 is a block diagram illustrating an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a subject and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail herein. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail herein; such models may include without limitation a training data classifier 216. Training data classifier 216 may include a "classifier," which as used in this disclosure is a machine-learning model as defined herein, such as a mathematical model, neural net, or program generated by a machine learning algorithm known as a "classification algorithm," as described in further detail herein, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to elements that characterizes a sub-population, such as a subset of estimated transfer times 116, accuracy measurement 140, and the like, associated with an alimentary element originator, location, transfer apparatus, and/or other analyzed items and/or phenomena for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail herein.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a plurality of sensor 124 signals and remote data as described above as inputs, optimum environment parameters, and a ranking function representing a desired form of relationship to be detected between inputs and outputs; ranking function may, for instance, seek to maximize the probability that a given input and/or combination of elements inputs is associated with a given output to minimize the probability that a given input is not associated with a given output. Ranking function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods.

Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 204.

Figure 3:
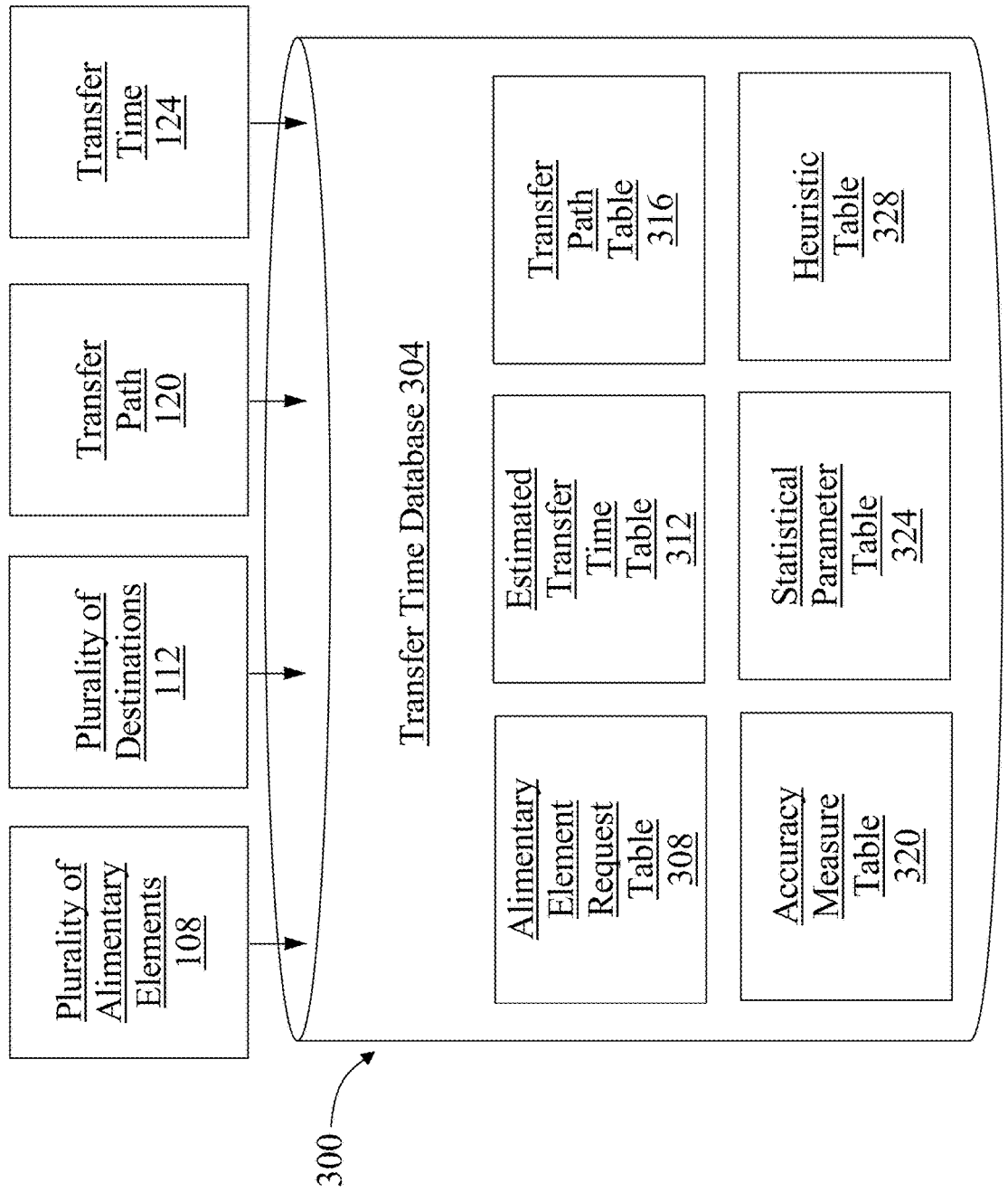
FIG. 3 is a block diagram illustrating an exemplary embodiment of a transfer time database.

Referring now to FIG. 3, a non-limiting exemplary embodiment 300 of a transfer time database 304 is illustrated. Transfer time database 304 may be implemented, without limitation, as a relational database, a key-value retrieval database such as a NOSQL database, or any other format or structure for use as a database that a person skilled in the art would recognize as suitable upon review of the entirety of this disclosure. Transfer time database 304 may alternatively or additionally be implemented using a distributed data storage protocol and/or data structure, such as a distributed hash table and the like. Transfer time database 304 may include a plurality of data entries and/or records, as described above. Data entries in an transfer time database 304 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Computing device 104 may retrieve any determinations, as described herein, from the transfer time database 304, such as a pattern of accessory device states as a function of the coordinated state change.

Further referring to FIG. 3, transfer time database 304 may include, without limitation, an alimentary element request table 308, estimated transfer time table 312, transfer path table 316, accuracy measure table 320, statistical parameter table 324, and/or heuristic table 328. Determinations by a machine-learning process, machine-learning model, ranking function, mapping algorithm and/or objection function, may also be stored and/or retrieved from the transfer time database 304, for instance in non-limiting examples a classifier describing a plurality of estimated transfer times as it relates to a plurality of alimentary element originators, wherein a classifier is an identifier that denotes a subset of data that contains a heuristic and/or relationship, as may be useful to system 100 described herein. As a non-limiting example, transfer time database 304 may organize data according to one or more instruction tables. One or more transfer time database 304 tables may be linked to one another by, for instance in a non-limiting example, common column values. For instance, a common column between two tables of transfer time database 304 may include an identifier of a submission, such as a form entry, textual submission, accessory device tokens, local access addresses, metrics, and the like, for instance as defined herein; as a result, a search by a computing device 104 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Still referring to FIG. 3, in a non-limiting embodiment, one or more tables of an transfer time database 304 may include, as a non-limiting example, an alimentary element request table 308, which may include categorized identifying data, as described above, including alimentary elements requested by users, alimentary element destinations, and the like. One or more tables may include estimated transfer time table 312, which may include data regarding time of preparation of alimentary element, transfer time of alimentary element, and the like, for instance and without limitation, that system 100 may use to retrieve and/or store. One or more tables may include transfer path table 316, which may transfer paths, such as optimal transfer paths determined elsewhere, and the like, for instance and without limitation, that system 100 may use to retrieve and/or store associated with an alimentary element destination, transfer apparatus location, alimentary element originator location, and the like. One or more tables may include accuracy measure table 320, which may include classifiers, accuracy data of estimated transfer times 116, and the like, as described above for instance and without limitation, that system 100 may use to retrieve and/or store accuracy measurements 128, statistical parameters 140, and the like, associated with subject. One of more tables may include an statistical parameter table 324, which may include outputs, determinations, variables, and the like, organized into subsets of data for transfer time variations 132 associated with transfer paths 120, transfer times 124, alimentary element originators, transfer apparatuses, and the like, associated with determining estimated transfer times 116 and/or accuracy measures 128. One or more tables may include, without limitation, a heuristic table 328, which may organize rankings, scores, models, outcomes, functions, numerical values, vectors, matrices, and the like, that represent determinations, optimizations, iterations, variables, and the like, include one or more inputs describing potential mathematical relationships, as described herein.

Figure 4:
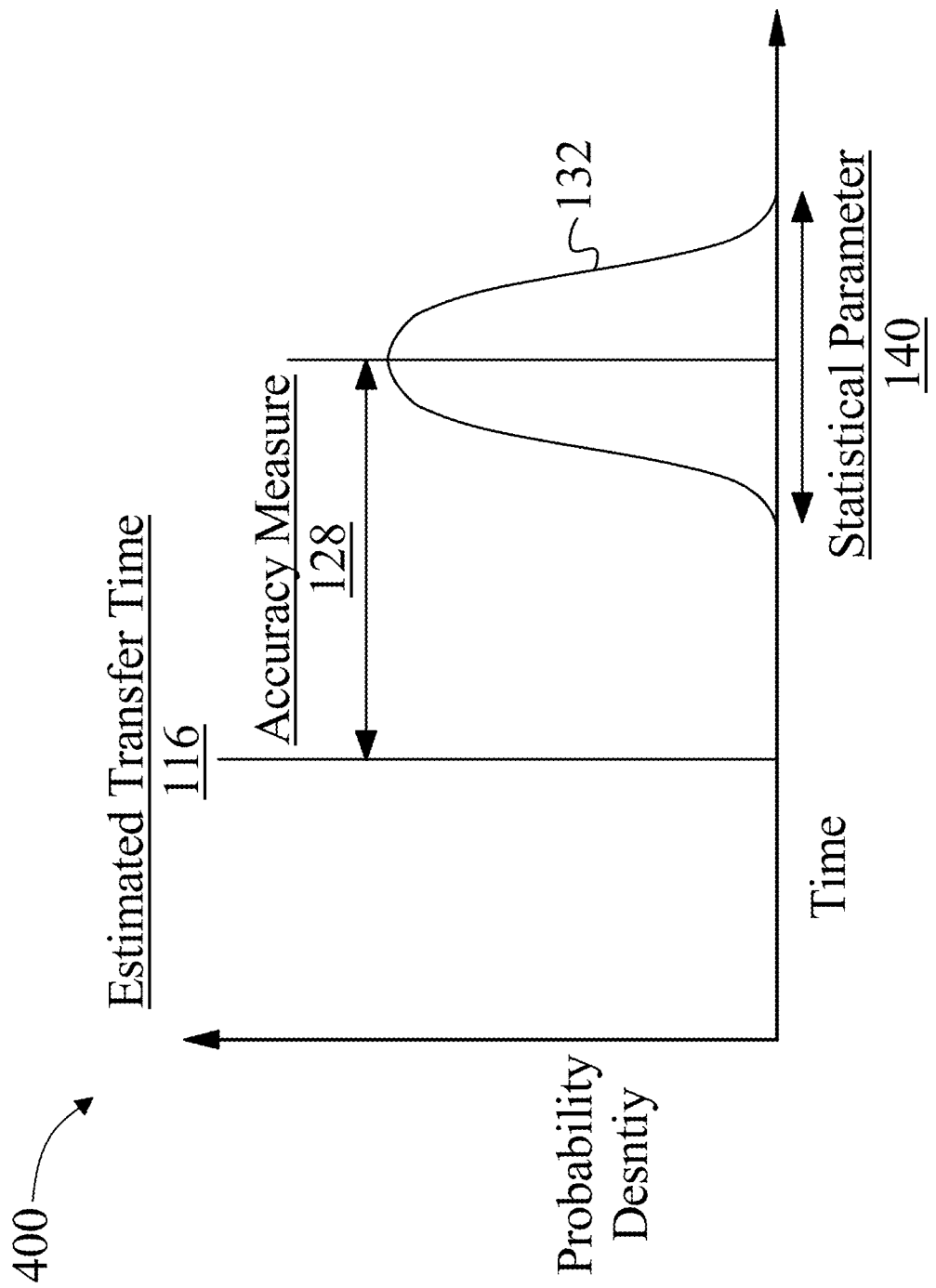
FIG. 4 is a diagrammatic representation illustrating an exemplary embodiment of an accuracy measure.

Continuing in reference to FIG. 4, a non-limiting exemplary embodiment 400 of accuracy measure 128 as a function of transfer time variation 124 and statistical parameter 140 is illustrated. As depicted in FIG. 4, estimated transfer time 116 may be illustrated as a discrete numerical value of time that is for at least an alimentary element from a period of time from a user sending an alimentary element request until the alimentary element reaches the alimentary element destination. Computing device 104 may determine a plurality of transfer time variations 124, depicted in FIG. 4 as a normal distribution of overall transfer times according to a set of limitations 136. In non-limiting illustrative examples, such a variation of transfer time variations 124 may depict hundreds of theoretical estimated transfer times 116 according to different values for variables in the set of limitations 136; for instance, varying degrees of traffic, inclement weather, different times of year, different alimentary element originators, different transfer apparatus methods, companies, different alimentary element program health rules, and the like. Statistical parameter 140 may be associated with the transfer path variations 132, for instance as a mean (denoted by vertical line at x=mean of transfer path variations 132), range of values, confidence intervals, etc. Accuracy measure 128 may include an accuracy measure of the estimated transfer time 116 according to the statistical parameter 140 and the transfer path variations 132. In such an instance that the accuracy measure 128 indicates a high likelihood of deviation from a first estimated transfer time 116, computing device 104 may update, modify, or otherwise recalculate estimated transfer time 116, providing a more accurate estimated transfer time 116.

Figure 5:
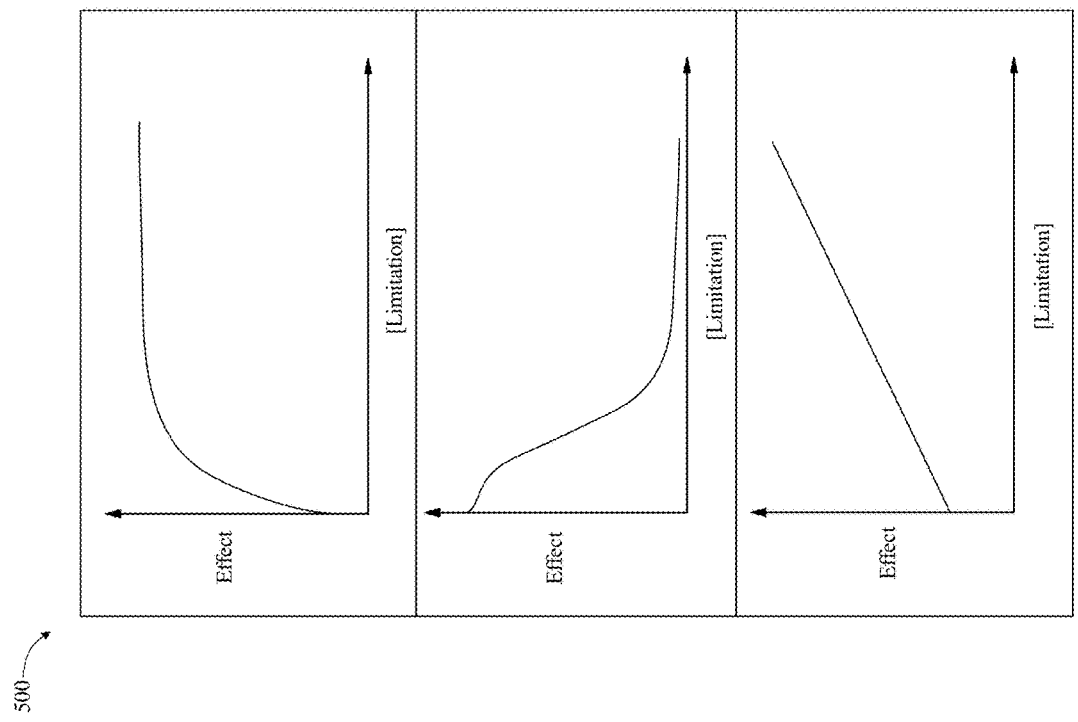
FIG. 5 is a diagrammatic representation illustrating an exemplary embodiment of a set of limitations.

Referring now to FIG. 5, a non-limiting exemplary embodiment 500 of a set of limitations 136 is illustrated. A set of limitations 136 may include a plurality of variables affecting estimated transfer time 116, as described above. For instance, a set of limitations 136 may affect a transfer apparatus traversing a transfer path 120 as a function of a variety of conditions. FIG. 5 depicts as a variety of functions, for instance and without limitation as determined by a machine-learning process, that graphs the relationship of the effect of a limitation on a transfer time 124 as a function of the magnitude and/or amount of the limitation applied. For instance, the top function describes the effect of a limitation that greatly impacts estimated transfer time 116 at lower values of the limitation but reaches a maximal limit of effect at some point, wherein increasing the limitation has diminished effect. In non-limiting illustrative examples, a stepwise function may illustrate a series of traffic jams, wherein each traffic stop such as at an intersection, increases the estimated transfer time 116 by a discrete amount of effect (time), but a maximal amount of intersections may be expected for a particular transfer path 120.

Figure 6:
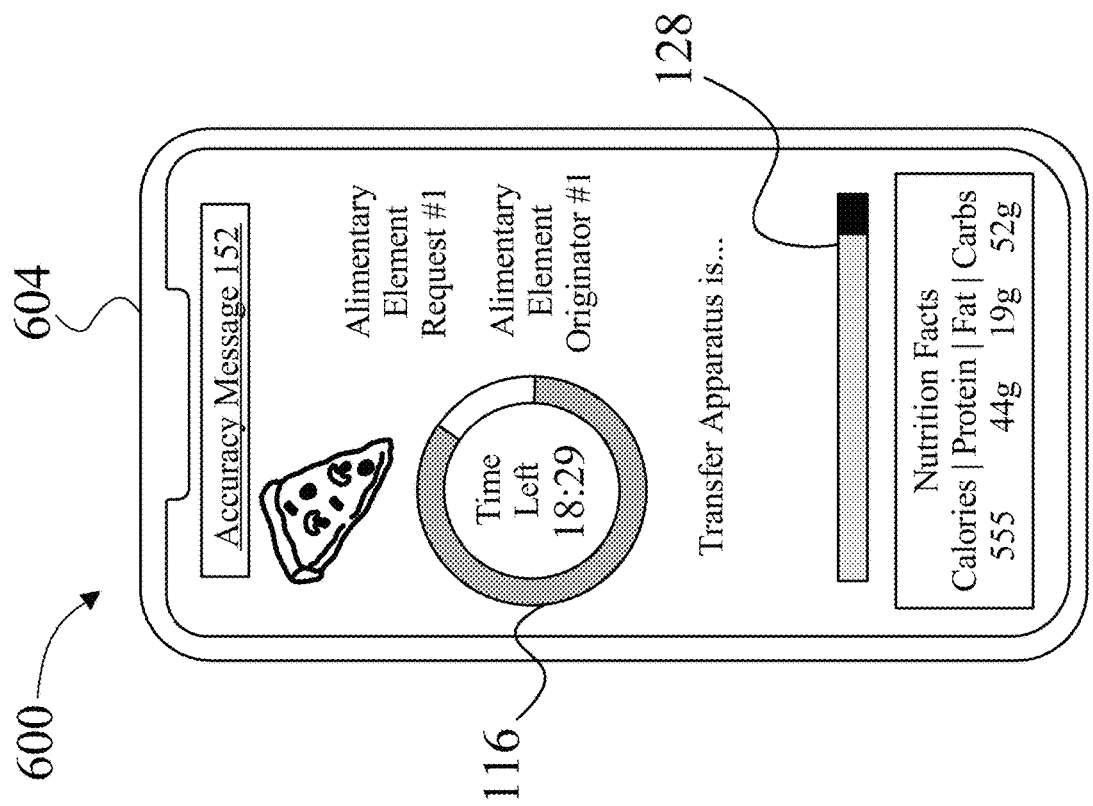
FIG. 6 is a diagrammatic representation illustrating an exemplary embodiment of a user device.

Referring now to FIG. 6, a non-limiting exemplary embodiment 600 of a user device is illustrated. User device 604 may be the same as computing device 104. User device 604 may include alimentary element originator device, as described above. User device 604 may include a "smartphone", mobile cellular device, laptop, tablet computer, internet-of-things (JOT) integrated device, or any other device compatible with system 100 as described herein. User device 604 may generate a representation, for instance via a graphical user interface, of an accuracy message 152. Accuracy message 152 may include, as depicted in FIG. 6, information for alimentary element originator, for instance the identity, location, and the like, of the originator; transfer apparatus, for instance the entity used to make the transfer including any identifying information; estimated transfer time 116, accuracy measure 128 for instance for the particular originator, transfer apparatus, overall estimated transfer time 116, and the like. Computing device 104 may generate a representation of an accuracy message 152 that contains different information depending on if the accuracy message 152 is intended for an alimentary element originator, transfer apparatus, and/or alimentary element requester.

Figure 7:
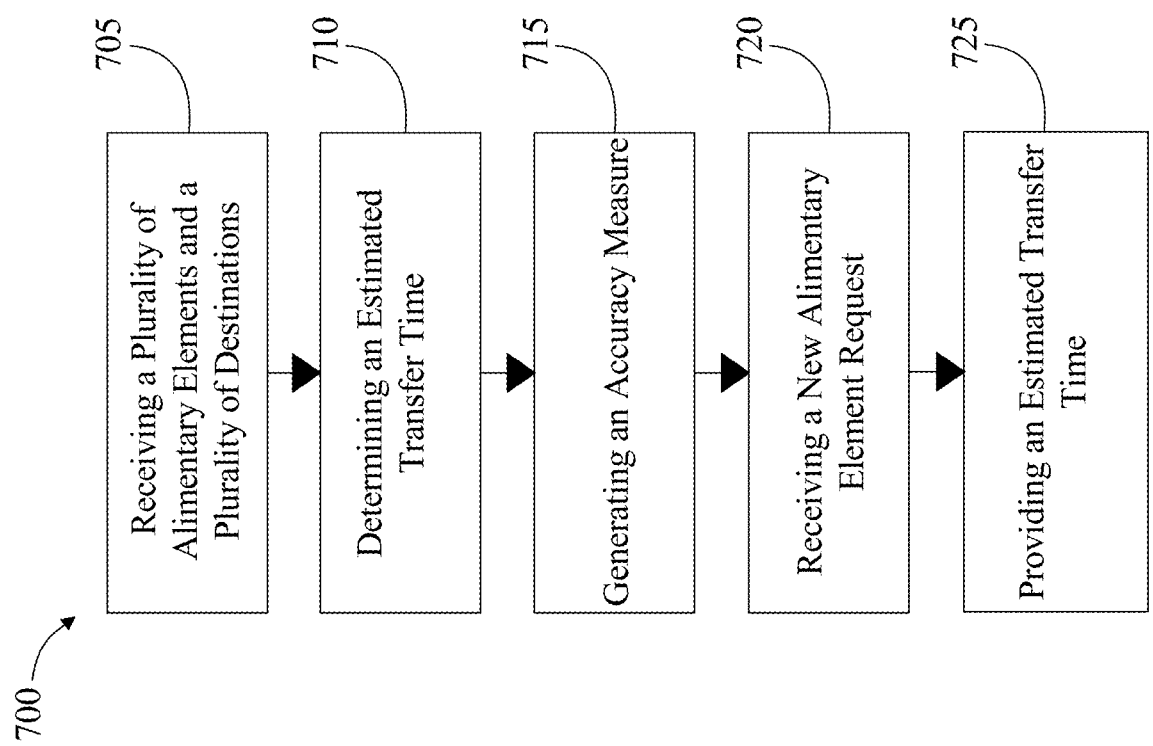
FIG. 7 is a flow diagram of an exemplary embodiment of a workflow of a method for determining estimated alimentary element transfer time.

Referring now to FIG. 7, an exemplary embodiment of a method 700 for determining estimated alimentary element transfer time is illustrated. At step 705, computing device 104 is adapted for receiving a plurality of alimentary elements and a plurality of destinations associated with the alimentary elements; this may be implemented, without limitation, as described above in FIGS. 1-6.

Still referring to FIG. 7, at step 710, computing device 104 is adapted for determining an estimated transfer time 116 for at least one alimentary element in the plurality of alimentary elements, wherein determining includes retrieving a plurality of locations of a plurality of transfer apparatuses from the computing device 104, wherein the plurality of transfer apparatuses are associated with a plurality of first locations, wherein the plurality of first locations are associated with a plurality of transfer paths 120 from an alimentary originator location to an alimentary element destination. The plurality of transfer paths 120 may include a first transfer path for at least a transfer apparatus to traverse from the first location to the location of the alimentary element originator, wherein the first transfer path minimizes time for traversing a first transfer path. The plurality of transfer paths 120 may include a second transfer path for at least a transfer apparatus to traverse from the location of the alimentary element originator to the alimentary element destination, wherein the second transfer path minimizes time for traversing a second transfer path; this may be implemented, without limitation, as described above in FIGS. 1-6.

Continuing in reference to FIG. 7, at step 715, computing device 104 is adapted for generating an accuracy measure 128 of estimated transfer time 116 based on the estimated transfer time 116, wherein generating the accuracy measure 152 may include computing a plurality of transfer time variations 132 from the estimated transfer time 116 and a set of limitations 128 of each alimentary element in the plurality of alimentary elements, and generating the accuracy measure 128 as a function of a plurality of statistical parameters 140 of the plurality of transfer time variations 132. The set of limitations 136 may include numerical data relating to the plurality of alimentary elements. The set of limitations 136 may include numerical data relating to the plurality of transfer apparatuses traversing the plurality of transfer paths 120. The set of limitations 136 may include at least an ancillary limitation that poses an effect on transfer path time 124. Deriving the plurality of statistical parameters 140 from the plurality of transfer time variations 132 may include calculating a likelihood the estimated transfer time 116 will deviate as a function of a change in the set of limitations 136. Generating an accuracy measure may include generating, using an accuracy machine-learning process 144, a function that estimates the accuracy of the estimated transfer time 116 based on which limitations are present and calculating a change in the estimated transfer time 116 based on the function; this may be implemented, without limitation, as described above in FIGS. 1-6.

Continuing in reference to FIG. 7, at step 720, computing device 104 is configured for receiving a new alimentary element request for the alimentary element originator from an alimentary element originator device; determine an updated estimated transfer time and an updated accuracy measure for the new alimentary element request; this may be implemented, without limitation, as described above in FIGS. 1-6.

Continuing in reference to FIG. 7, at step 725, computing device 104 is adapted for providing an estimated transfer time 116, wherein providing the estimated transfer time 116 includes receiving a new alimentary element request for the alimentary element originator from an alimentary element originator device, retrieving an estimated transfer time from the new alimentary element request, retrieving the accuracy measure of the alimentary element originator from the alimentary element server, and generating, based on the accuracy measure 128 and estimated transfer time 116 for the new alimentary element request, an estimated transfer time accuracy message 152 for the new alimentary element. Generating the estimated transfer time 116 and the estimated transfer time accuracy message 152 to the alimentary element originator device may include generating a representation, via a graphical user interface, of the estimated transfer time 116 and the estimated transfer time accuracy message 152 to an alimentary element originator device. Generating the estimated transfer time 116 and the estimated transfer time accuracy message 152 may include generating a representation, via a graphical user interface, of the estimated transfer time 116 and the estimated transfer time accuracy message 152 to a user device; this may be implemented, without limitation, as described above in FIGS. 1-6.

Figure 8:
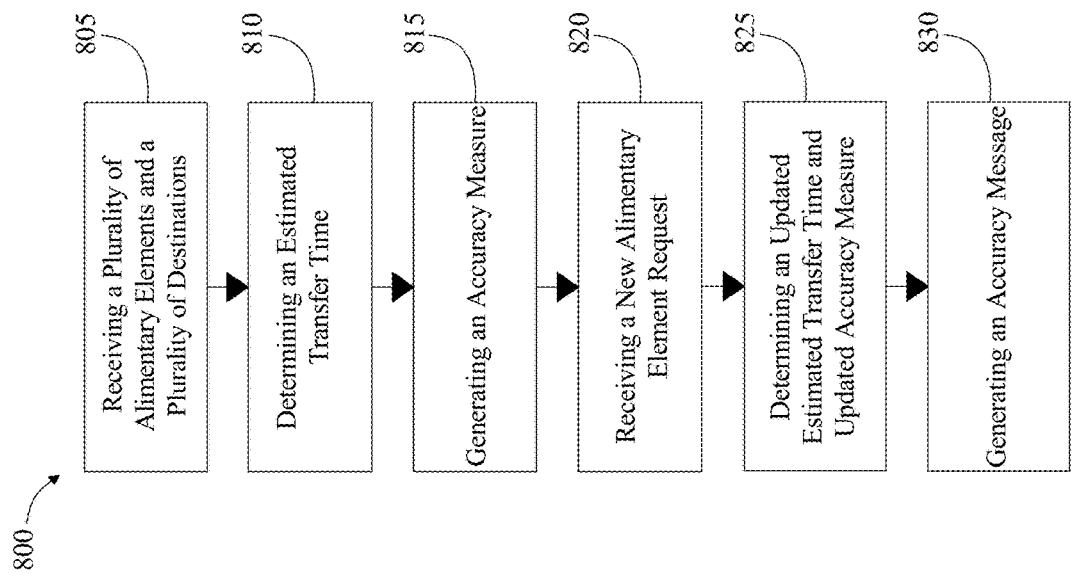
FIG. 8 is a is an exemplary flow diagram of a method for determining estimated alimentary element transfer time.

Referring now to FIG. 8, is an exemplary flow diagram of a method 800 for determining estimated alimentary element transfer time. At step 805, method 800 includes receiving, by a computing device, a plurality of alimentary elements and a plurality of destinations associated with the alimentary elements, for example and with reference to FIGS. 1-7. In some embodiments, determining an estimated transfer time may further include retrieving a plurality of transfer paths from an alimentary originator location to an alimentary element destination, wherein each transfer path of the plurality of transfer paths is associated with a transfer apparatus of a plurality of transfer apparatuses and a current location of the respective transfer apparatus; generating a plurality of transfer times associated with the plurality of transfer paths; and determining an estimated transfer time as a function of the plurality of transfer times. At step 810, method 800 includes determining, by the computing device an estimated transfer time for at least one alimentary element in the plurality of alimentary elements, for example and with reference to FIGS. 1-7.

Still referring to FIG. 8, at step 815, method 800 includes generating, by the computing device, an accuracy measure of the estimated transfer time based on the estimated transfer time, for example and with reference to FIGS. 1-7. Generating the accuracy measure further includes computing a set of limitations of each alimentary element in the plurality of alimentary elements, wherein the set of limitations includes at least an ancillary limitation including at least a dietary restriction based on a user's biological data; and numerical data relating to the plurality of transfer apparatuses traversing the plurality of transfer paths, including at least inclement weather; training a machine-learning model utilizing training data comprising at least a plurality of transfer time variations to generate the accuracy measures; successively determine an accuracy measure of the estimated transfer time for each of the plurality of alimentary elements; and successively retrain the machine-learning model. In some embodiments, generating an accuracy measure of the estimated transfer time may further include computing a plurality of statistical parameters of a plurality of transfer time variations from the estimated transfer time. Additionally, computing a plurality of statistical parameters may include calculating a likelihood a transfer time will deviate as a function of a change in the set of limitations.

Still referring to FIG. 1, method 800 may include generating, by the computing device, training data to train the machine-learning model including a plurality of entries, wherein each entry models the set of limitations to data related to the transfer time variations, and wherein generating the training data includes filtering the training data using a training data classifier. In some embodiments, generating the machine-learning model that generates the accuracy measure of the estimated transfer time may further include using linear regression based on a vector-space distance norm. In some embodiments, successively retraining the machine-learning model may further include successively updating the training data with the input to the machine-learning model and the output of the machine-learning model associated with each successive determination of the accuracy measure. In some embodiments, the plurality of transfer paths may further include a first transfer path for at least a transfer apparatus traversing from the current location of the at least a transfer apparatus of the plurality of transfer apparatuses to the location of the alimentary element originator. In some embodiments, the plurality of transfer paths further includes a second transfer path for at least a transfer apparatus of the plurality of transfer apparatuses traversing from the location of the alimentary element originator to the alimentary element destination. In some embodiments, generating the accuracy message to the alimentary element originator device may further include generating a representation, via a graphical user interface, of the estimated transfer time and the accuracy message to the alimentary element originator device.

Still referring to FIG. 8, at step 820, method 800 includes receiving, by the computing device, a new alimentary element request for an alimentary element originator from an alimentary element originator device, for example and with reference to FIGS. 1-7. At step 825, method 800 includes determining, by the computing device, an updated estimated transfer time and an updated accuracy measure, using the retrained machine-learning model for the new alimentary element request, for example and with reference to FIGS. 1-7. At step 830, method 800 includes generating, by the computing device, an accuracy message, based on the updated accuracy measure and the updated estimated transfer time, for example and with reference to FIGS. 1-7.

It is important to note that the plurality of transfer apparatuses is associated with a plurality of transfer paths from the plurality of first locations to the alimentary originator location. For instance and without limitation, if the time it takes a transfer apparatus to complete a transfer path from a first location to an alimentary element originator is greater than the time it takes the alimentary element originator to prepare an alimentary element, that time is material to the estimated transfer time 116 calculation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
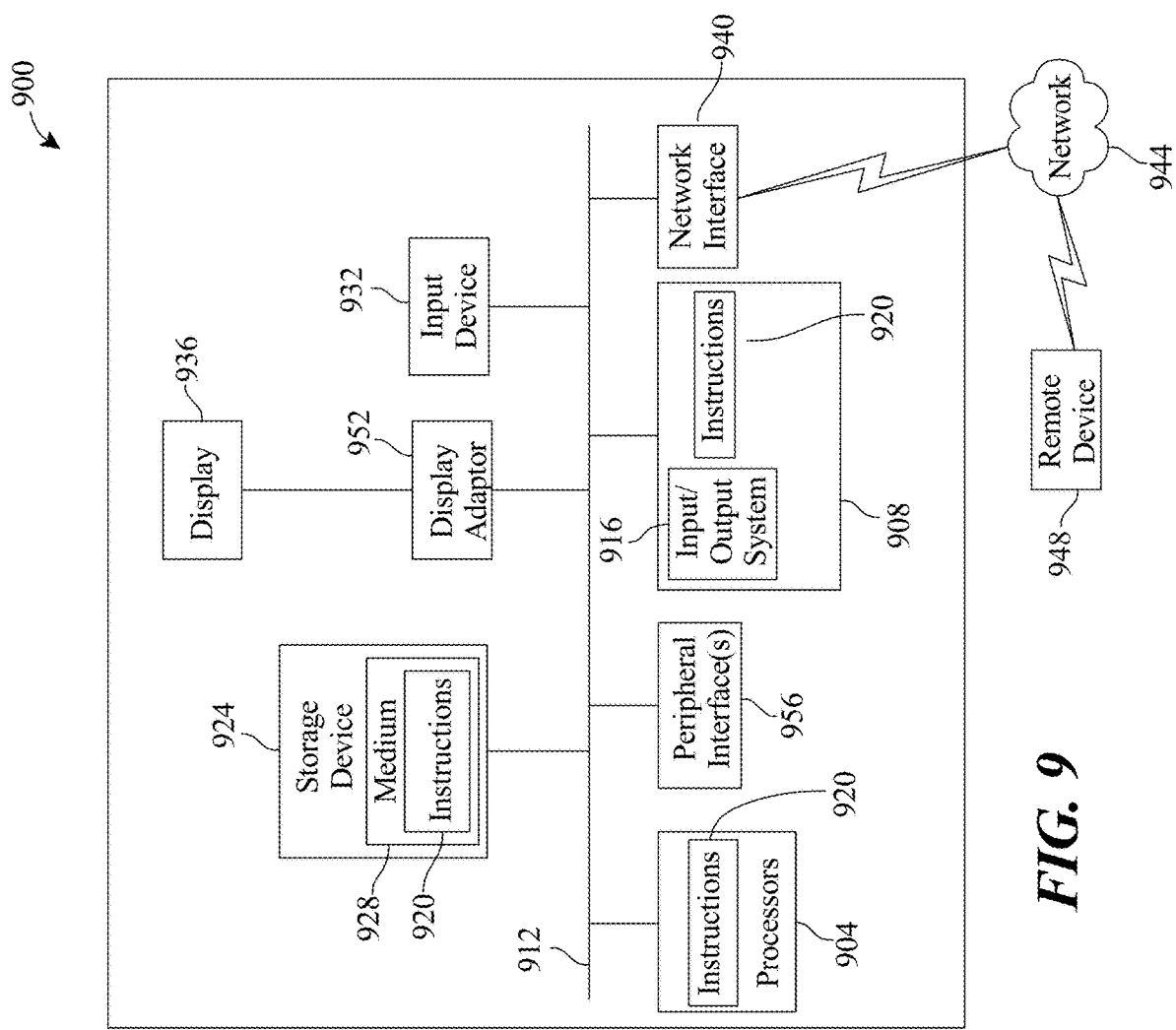
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for determining estimated alimentary element transfer time, the system comprising:
a computing device, the computing device configured to:
receive a plurality of alimentary elements and a plurality of destinations associated with the alimentary elements;
determine an estimated transfer time for at least one alimentary element of the plurality of alimentary elements;
generate an accuracy measure of the estimated transfer time based on the estimated transfer time, wherein generating the accuracy measure further comprises:
computing a set of limitations of each alimentary element in the plurality of alimentary elements, wherein the set of limitations comprises:
at least an ancillary limitation comprising at least a dietary restriction based on a user's biological data;
numerical data relating to a plurality of transfer apparatuses traversing a plurality of transfer paths, including at least inclement weather; and
utilizes an accuracy machine learning process comprising a machine-learning model which further comprises:
receiving a training data set, wherein the training data set comprises outputs correlated to inputs, wherein the inputs comprise at least a plurality of transfer time variations correlated to outputs comprising accuracy measures;
generating an accuracy measure of the estimated transfer time using the trained machine-learning model;
successively determining the accuracy measure of the estimated transfer time for each alimentary element of the plurality of alimentary elements;
successively update the training data set with the input to the machine-learning model and the output of the machine-learning model associated with each successive determination of the accuracy measure; and
successively retrain the machine-learning model;
receive a new alimentary element request for an alimentary element originator from an alimentary element originator device;
determine an updated estimated transfer time and an updated accuracy measure, using the retrained machine-learning model for the new alimentary element request;
generate an accuracy message, based on the updated accuracy measure and the updated estimated transfer time; and
generate a representation, via a graphical user interface, the estimated transfer time and the estimated transfer time accuracy message to the alimentary element originator device.

2. The system of claim 1, wherein determining an estimated transfer time further comprises:
retrieving a plurality of transfer paths from an alimentary originator location to an alimentary element destination, wherein each transfer path of the plurality of transfer paths is associated with a transfer apparatus of a plurality of transfer apparatuses and a current location of the respective transfer apparatus;
generating a plurality of transfer times associated with the plurality of transfer paths; and
determining an estimated transfer time as a function of the plurality of transfer times.

3. The system of claim 1, wherein generating an accuracy measure of the estimated transfer time further comprises computing a plurality of statistical parameters of a plurality of transfer time variations from the estimated transfer time.

4. The system of claim 3, further comprising calculating a likelihood a transfer time will deviate as a function of a change in the set of limitations.

5. The system of claim 1, further comprising generating training data to train the machine-learning model including a plurality of entries, wherein each entry models the set of limitations to data related to the transfer time variations, and wherein generating the training data includes filtering the training data using a training data classifier.

6. The system of claim 1, wherein generating the machine-learning model that generates the accuracy measure of the estimated transfer time further comprises using linear regression based on a vector-space distance norm.

7. The system of claim 1, wherein successively retraining the machine-learning model further comprises successively updating the training data with the input to the machine-learning model and the output of the machine-learning model associated with each successive determination of the accuracy measure.

8. The system of claim 1, wherein the plurality of transfer paths further comprises a first transfer path for at least a transfer apparatus traversing from a current location of the at least a transfer apparatus of the plurality of transfer apparatuses to the location of the alimentary element originator.

9. The system of claim 8, wherein the plurality of transfer paths further comprises a second transfer path for at least a transfer apparatus of the plurality of transfer apparatuses traversing from the location of the alimentary element originator to the alimentary element destination.

10. A method for determining estimated alimentary element transfer time, the method comprising:
    receiving, by a computing device, a plurality of alimentary elements and a plurality of destinations associated with the alimentary elements;
    determining, by the computing device an estimated transfer time for at least one alimentary element in the plurality of alimentary elements;
    generating, by the computing device, an accuracy measure of the estimated transfer time based on the estimated transfer time, wherein generating the accuracy measure further comprises:
        computing a set of limitations of each alimentary element in the plurality of alimentary elements, wherein the set of limitations comprises:
            at least an ancillary limitation comprising at least a dietary restriction based on a user's biological data; and
            numerical data relating to a plurality of transfer apparatuses traversing a plurality of transfer paths, including at least inclement weather; and
        utilizing an accuracy machine learning process comprising a machine-learning model which further comprises:
            receiving a training data set, wherein the training data set comprises outputs correlated to inputs, wherein the inputs comprise at least a plurality of transfer time variations correlated to outputs comprising accuracy measures;
            generating an accuracy measure of the estimated transfer time using the trained machine-learning model;
            successively determine an accuracy measure of the estimated transfer time for each of the plurality of alimentary elements;
            successively update the training data with the input to the machine-learning model and the output of the machine-learning model associated with each successive determination of the accuracy measure; and
            successively retrain the machine-learning model;
    receiving, by the computing device, a new alimentary element request for an alimentary element originator from an alimentary element originator device;
    determining, by the computing device, an updated estimated transfer time and an updated accuracy measure, using the retrained machine-learning model for the new alimentary element request;
    generating, by the computing device, an accuracy message, based on the updated accuracy measure and the updated estimated transfer time; and
    generate a representation, via a graphical user interface, the estimated transfer time and the estimated transfer time accuracy message to the alimentary element originator device.

11. The method of claim 10, wherein determining an estimated transfer time further comprises:
    retrieving a plurality of transfer paths from an alimentary originator location to an alimentary element destination, wherein each transfer path of the plurality of transfer paths is associated with a transfer apparatus of a plurality of transfer apparatuses and a current location of the respective transfer apparatus;
    generating a plurality of transfer times associated with the plurality of transfer paths; and
    determining an estimated transfer time as a function of the plurality of transfer times.

12. The method of claim 10, wherein generating an accuracy measure of the estimated transfer time further comprises computing a plurality of statistical parameters of a plurality of transfer time variations from the estimated transfer time.

13. The method of claim 12, further comprising calculating a likelihood a transfer time will deviate as a function of a change in the set of limitations.

14. The method of claim 10, further comprising generating, by the computing device, training data to train the machine-learning model including a plurality of entries, wherein each entry models the set of limitations to data related to the transfer time variations, and wherein generating the training data includes filtering the training data using a training data classifier.

15. The method of claim 10, wherein generating the machine-learning model that generates the accuracy measure of the estimated transfer time further comprises using linear regression based on a vector-space distance norm.

16. The method of claim 10, wherein successively retraining the machine-learning model further comprises successively updating the training data with the input to the machine-learning model and the output of the machine-learning model associated with each successive determination of the accuracy measure.

17. The method of claim 10, wherein the plurality of transfer paths further comprises a first transfer path for at least a transfer apparatus traversing from a current location of the at least a transfer apparatus of the plurality of transfer apparatuses to the location of the alimentary element originator.

18. The method of claim 17, wherein the plurality of transfer paths further comprises a second transfer path for at least a transfer apparatus of the plurality of transfer apparatuses traversing from the location of the alimentary element originator to the alimentary element destination.

* * * * *